(12) United States Patent
Smith et al.

(10) Patent No.: US 12,154,230 B2
(45) Date of Patent: Nov. 26, 2024

(54) AUGMENTED REALITY MESSENGER SYSTEM

(71) Applicant: Snap Inc., Santa Monica, CA (US)

(72) Inventors: Brian Anthony Smith, Brentwood, NY (US); Yu Jiang Tham, Los Angeles, CA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/470,546

(22) Filed: Sep. 9, 2021

(65) Prior Publication Data

US 2022/0076492 A1 Mar. 10, 2022

Related U.S. Application Data

(60) Provisional application No. 62/706,776, filed on Sep. 9, 2020.

(51) Int. Cl.
*G06T 19/00* (2011.01)
*G06V 40/16* (2022.01)
*H04L 51/10* (2022.01)
*H04L 51/222* (2022.01)

(52) U.S. Cl.
CPC .......... *G06T 19/006* (2013.01); *G06V 40/166* (2022.01); *G06V 40/176* (2022.01); *H04L 51/10* (2013.01); *H04L 51/222* (2022.05)

(58) Field of Classification Search
None
See application file for complete search history.

(56) References Cited

U.S. PATENT DOCUMENTS

| 8,264,529 B2 | 9/2012 | Goulart et al. |
| 8,412,773 B1 | 4/2013 | Chapweske et al. |
| 8,451,994 B2 | 5/2013 | Abuan et al. |
| 8,520,072 B1 | 8/2013 | Slavin et al. |

(Continued)

FOREIGN PATENT DOCUMENTS

| CN | 103076875 | 5/2013 |
| CN | 106663411 A | 5/2017 |

(Continued)

OTHER PUBLICATIONS

E.A. Heredia, "5-Smart Home Networking for Content Management", 2015, Ecological Design of Smart Home Networks, pp. 67-85 doi.org/10.1016/B978-1-78242-119-1.00005-9 (Year: 2015).*

(Continued)

*Primary Examiner* — Michael J Cobb
(74) *Attorney, Agent, or Firm* — Schwegman Lundberg & Woessner, P.A.

(57) ABSTRACT

Systems and methods herein describe an augmented reality messenger system. The proposed systems and methods generate an augmented reality content item based on input from a first computing device, generate a contextual trigger for the generated augmented reality content, the contextual trigger defining a set of conditions for presenting the generated augmented reality content item on a second computing device, and cause presentation of the generated augmented reality content item on the second computing device based on at least one condition of the set of conditions being satisfied.

18 Claims, 19 Drawing Sheets

(56) References Cited

U.S. PATENT DOCUMENTS

| | | |
|---|---|---|
| 8,675,071 B1 | 3/2014 | Slavin et al. |
| 8,810,657 B1 | 8/2014 | Slavin et al. |
| 8,874,090 B2 | 10/2014 | Abuan et al. |
| 8,937,661 B1 | 1/2015 | Slavin et al. |
| 9,148,702 B1 | 9/2015 | Ko et al. |
| 9,560,223 B2 | 1/2017 | Johnson et al. |
| 9,747,012 B1 | 8/2017 | Moczydlowski |
| 9,830,567 B2 | 11/2017 | Weiss |
| 10,296,722 B2* | 5/2019 | Rock ..................... G16H 40/67 |
| 10,432,996 B2 | 10/2019 | Dacus et al. |
| 10,475,106 B1* | 11/2019 | Tang ..................... G06N 20/10 |
| 10,740,804 B2 | 8/2020 | Spivack et al. |
| 10,862,838 B1* | 12/2020 | Bodapati .............. H04M 1/7243 |
| 10,897,564 B1 | 1/2021 | Smith et al. |
| 11,132,703 B2 | 9/2021 | Koenig |
| 11,176,484 B1* | 11/2021 | Dorner .................. G06F 16/738 |
| 11,249,714 B2 | 2/2022 | Spivack et al. |
| 11,412,298 B1* | 8/2022 | Anzalone ................ A61B 5/165 |
| 11,611,608 B1 | 3/2023 | Smith et al. |
| 11,880,946 B2 | 1/2024 | Smith et al. |
| 2002/0065728 A1 | 5/2002 | Ogasawara |
| 2010/0118111 A1 | 5/2010 | Bouazizi |
| 2010/0214398 A1 | 8/2010 | Goulart et al. |
| 2010/0313113 A1* | 12/2010 | Chen ....................... G06F 16/70 715/205 |
| 2011/0249075 A1 | 10/2011 | Abuan et al. |
| 2011/0249077 A1 | 10/2011 | Abuan et al. |
| 2011/0249078 A1 | 10/2011 | Abuan et al. |
| 2011/0249086 A1 | 10/2011 | Guo et al. |
| 2012/0058801 A1 | 3/2012 | Nurmi |
| 2012/0206335 A1 | 8/2012 | Osterhout et al. |
| 2013/0021373 A1* | 1/2013 | Vaught ..................... G06F 3/013 345/633 |
| 2013/0265378 A1 | 10/2013 | Abuan et al. |
| 2014/0146084 A1 | 5/2014 | Polo et al. |
| 2014/0178029 A1* | 6/2014 | Raheman ......... H04N 21/41415 386/224 |
| 2014/0225924 A1 | 8/2014 | Loxam et al. |
| 2014/0310595 A1* | 10/2014 | Acharya ................. G06F 3/011 715/706 |
| 2014/0354532 A1* | 12/2014 | Mullins .................. G06V 20/20 345/156 |
| 2015/0254618 A1 | 9/2015 | Shivaram |
| 2015/0350136 A1 | 12/2015 | Flynn, III et al. |
| 2016/0192166 A1 | 6/2016 | Decharms |
| 2017/0026672 A1 | 1/2017 | Dacus et al. |
| 2017/0337742 A1* | 11/2017 | Powderly ............. G06K 7/1408 |
| 2018/0005272 A1 | 1/2018 | Todasco et al. |
| 2018/0089880 A1* | 3/2018 | Garrido .................. H04L 65/61 |
| 2018/0114372 A1* | 4/2018 | Nagy ..................... G06T 19/006 |
| 2018/0167427 A1 | 6/2018 | Kedenburg, III |
| 2018/0268609 A1 | 9/2018 | Schneider et al. |
| 2018/0278994 A1 | 9/2018 | Holden et al. |
| 2018/0300916 A1* | 10/2018 | Barnett ................. G06Q 10/10 |
| 2018/0322801 A1* | 11/2018 | Dey ........................ G06F 17/18 |
| 2018/0345129 A1 | 12/2018 | Rathod |
| 2019/0036989 A1 | 1/2019 | Eirinberg et al. |
| 2019/0052925 A1 | 2/2019 | Mcdowell et al. |
| 2019/0080342 A1 | 3/2019 | Andon et al. |
| 2019/0080344 A1 | 3/2019 | Faris et al. |
| 2019/0081947 A1 | 3/2019 | Faris et al. |
| 2019/0087842 A1 | 3/2019 | Koenig |
| 2019/0107990 A1 | 4/2019 | Spivack et al. |
| 2019/0107991 A1* | 4/2019 | Spivack .................. G09G 5/14 |
| 2019/0108558 A1 | 4/2019 | Spivack et al. |
| 2019/0108578 A1* | 4/2019 | Spivack ................. G09B 5/065 |
| 2019/0147481 A1 | 5/2019 | Shrivastava |
| 2019/0213619 A1 | 7/2019 | Andon et al. |
| 2019/0222806 A1* | 7/2019 | Soppelsa ................ H04N 5/272 |
| 2019/0251750 A1 | 8/2019 | Brewer et al. |
| 2019/0279250 A1* | 9/2019 | Gordon ................. H04L 51/222 |
| 2019/0362554 A1* | 11/2019 | Chen ..................... G06T 19/006 |
| 2019/0370556 A1 | 12/2019 | Kline et al. |
| 2019/0394533 A1 | 12/2019 | Chakraborty et al. |
| 2020/0019295 A1 | 1/2020 | Spivack et al. |
| 2020/0026922 A1 | 1/2020 | Pekelny et al. |
| 2020/0029113 A1 | 1/2020 | Dacus et al. |
| 2020/0066045 A1 | 2/2020 | Stahl et al. |
| 2020/0226481 A1* | 7/2020 | Sim .......................... G06F 21/34 |
| 2021/0074068 A1* | 3/2021 | Spivack .................. G06F 3/011 |
| 2021/0319514 A1* | 10/2021 | Jones ..................... G06Q 40/06 |
| 2022/0067373 A1 | 3/2022 | Stone et al. |
| 2022/0076492 A1* | 3/2022 | Smith .................. G06T 19/006 |
| 2022/0084295 A1* | 3/2022 | Smith ..................... H04L 51/10 |
| 2022/0086111 A1 | 3/2022 | Smith et al. |
| 2022/0172239 A1 | 6/2022 | Smith et al. |
| 2022/0237878 A1* | 7/2022 | Tartz ..................... G06V 20/00 |
| 2023/0177775 A1* | 6/2023 | Dudovitch .............. G06F 3/011 345/633 |
| 2023/0188594 A1 | 6/2023 | Smith et al. |

FOREIGN PATENT DOCUMENTS

| | | |
|---|---|---|
| CN | 108141526 A | 6/2018 |
| CN | 109034167 A | 12/2018 |
| CN | 109643166 | 4/2019 |
| CN | 110199299 | 9/2019 |
| CN | 111492330 A | 8/2020 |
| CN | 116076063 A | 5/2023 |
| CN | 116134797 A | 5/2023 |
| CN | 116171566 A | 5/2023 |
| CN | 116584101 A | 8/2023 |
| JP | 2009032042 | 2/2009 |
| JP | 2019177076 | 10/2019 |
| WO | 2017072534 | 5/2017 |
| WO | WO-2018104834 A1 | 6/2018 |
| WO | 2018204879 | 11/2018 |
| WO | 2019055703 | 3/2019 |
| WO | 2019079826 | 4/2019 |
| WO | 2022056118 | 3/2022 |
| WO | 2022060829 | 3/2022 |
| WO | 2022061362 | 3/2022 |
| WO | WO-2022115591 A1 | 6/2022 |

OTHER PUBLICATIONS

"International Application Serial No. PCT/US2021/049653, International Search Report mailed Nov. 25, 2021", 5 pgs.

"International Application Serial No. PCT/US2021/049653, Written Opinion mailed Nov. 25, 2021", 5 pgs.

"International Application Serial No. PCT/US2021/071494, International Search Report mailed Nov. 30, 2021", 4 pgs.

"International Application Serial No. PCT/US2021/071494, Written Opinion mailed Nov. 30, 2021", 5 pgs.

"International Application Serial No. PCT/US2021/050445, International Search Report mailed Dec. 1, 2021", 4 pgs.

"International Application Serial No. PCT/US2021/050445, Written Opinion mailed Dec. 1, 2021", 6 pgs.

"U.S. Appl. No. 16/947,089, Non Final Office Action mailed Feb. 17, 2022", 10 pgs.

"International Application Serial No. PCT/US2021/060803, International Search Report mailed Mar. 1, 2022", 4 pgs.

"International Application Serial No. PCT/US2021/060803, Written Opinion mailed Mar. 1, 2022", 5 pgs.

"U.S. Appl. No. 16/947,089, Final Office Action mailed Jun. 10, 2022", 11 pgs.

"U.S. Appl. No. 16/947,089, Notice of Allowance mailed Oct. 26, 2022", 9 pgs.

"U.S. Appl. No. 16/947,089, Notice of Allowance mailed Nov. 18, 2022", 8 pgs.

"U.S. Appl. No. 16/947,089, Response filed May 17, 2022 to Non Final Office Action mailed Feb. 17, 2022", 9 pgs.

"U.S. Appl. No. 16/947,089, Response filed Oct. 10, 2022 to Final Office Action mailed Jun. 10, 2022", 9 pgs.

"U.S. Appl. No. 17/476,085, Non Final Office Action mailed Sep. 1, 2022", 22 pgs.

"U.S. Appl. No. 17/477,359, Final Office Action mailed Oct. 11, 2022", 13 pgs.

(56) References Cited

OTHER PUBLICATIONS

"U.S. Appl. No. 17/477,359, Non Final Office Action mailed Jun. 22, 2022", 12 pgs.
"U.S. Appl. No. 17/477,359, Response filed Jan. 11, 2023 to Final Office Action mailed Oct. 11, 2022", 9 pgs.
"U.S. Appl. No. 17/477,359, Response filed Sep. 22, 2022 to Non Final Office Action mailed Jun. 22, 2022", 9 pgs.
"U.S. Appl. No. 17/480,513, Non-Final Office Action mailed Oct. 25, 2022", 21 pgs.
"U.S. Appl. No. 17/480,513, Response filed Jan. 25, 2023 to Non Final Office Action mailed Oct. 25, 2022", 14 pgs.
Johnson, Mark R, et al., "And Today's Top Donator is: How Live Streamers on Twitch.tv Monetize and Gamify Their Broadcasts", Social Media + Society, 5(4), https://doi.org/10.1177/2056305119881694, (2019), 11 pgs.
"U.S. Appl. No. 17/476,085, Final Office Action mailed Feb. 17, 2023", 27 pgs.
"U.S. Appl. No. 17/476,085, Notice of Allowance mailed Jul. 17, 2023", 10 pgs.
"U.S. Appl. No. 17/476,085, Response filed Feb. 2, 2023 to Non Final Office Action mailed Sep. 1, 2022", 11 pgs.
"U.S. Appl. No. 17/476,085, Response filed May 17, 2023 to Final Office Action mailed Feb. 17, 2023", 12 pgs.
"U.S. Appl. No. 17/477,359, Non Final Office Action mailed Mar. 16, 2023", 14 pgs.
"U.S. Appl. No. 17/477,359, Response filed Jun. 16, 2023 to Non Final Office Action mailed Mar. 16, 2023", 11 pgs.
"U.S. Appl. No. 17/480,513, Final Office Action mailed Apr. 12, 2023", 31 pgs.
"U.S. Appl. No. 17/480,513, Response filed Jul. 11, 2023 to Final Office Action mailed Apr. 12, 2023", 18 pgs.
"International Application Serial No. PCT/US2021/049653, International Preliminary Report on Patentability mailed Mar. 23, 2023", 7 pgs.
"International Application Serial No. PCT/US2021/050445, International Preliminary Report on Patentability mailed Mar. 30, 2023", 8 pgs.
"International Application Serial No. PCT/US2021/060803, International Preliminary Report on Patentability mailed Jun. 15, 2023", 7 pgs.
"International Application Serial No. PCT/US2021/071494, International Preliminary Report on Patentability mailed Mar. 30, 2023", 7 pgs.
U.S. Appl. No. 18/166,687, filed Feb. 9, 2023, On-Demand Camera Sharing Over a Network.
"U.S. Appl. No. 17/476,085, Corrected Notice of Allowability mailed Oct. 26, 2023", 5 pgs.
"U.S. Appl. No. 17/476,085, Corrected Notice of Allowability mailed Dec. 21, 2023", 2 pgs.
"U.S. Appl. No. 17/477,359, Final Office Action mailed Oct. 30, 2023", 14 pgs.
"U.S. Appl. No. 17/480,513, Final Office Action mailed Feb. 8, 2024", 41 pgs.
"U.S. Appl. No. 17/480,513, Non Final Office Action mailed Sep. 7, 2023", 31 pgs.
"U.S. Appl. No. 17/480,513, Response filed Dec. 5, 23 to Non Final Office Action mailed Sep. 7, 2023", 17 pgs.
"U.S. Appl. No. 18/166,687, Final Office Action mailed Feb. 14, 2024", 11 pgs.
"U.S. Appl. No. 18/166,687, Non Final Office Action mailed Oct. 11, 2023", 15 pgs.
"U.S. Appl. No. 18/166,687, Response filed Jan. 11, 24 to Non Final Office Action mailed Oct. 11, 2023", 11 pgs.
"U.S. Appl. No. 17/477,359, Non Final Office Action mailed May 14, 2024", 16 pgs.
"U.S. Appl. No. 17/477,359, Response filed Apr. 27, 2024 to Final Office Action mailed Oct. 30, 2023", 10 pgs.
"U.S. Appl. No. 17/480,513, Examiner Interview Summary mailed May 3, 2024", 3 pgs.
"U.S. Appl. No. 17/480,513, Response filed May 8, 2024 to Final Office Action mailed Feb. 8, 2024", 20 pgs.
"U.S. Appl. No. 18/166,687, Advisory Action mailed Apr. 18, 2024", 3 pgs.
"U.S. Appl. No. 18/166,687, Corrected Notice of Allowability mailed May 29, 2024", 2 pgs.
"U.S. Appl. No. 18/166,687, Notice of Allowance mailed May 17, 2024", 10 pgs.
"U.S. Appl. No. 18/166,687, Response filed Apr. 5, 2024 to Final Office Action mailed Feb. 14, 2024", 12 pgs.
"Chinese Application Serial No. 202180054782.5, Office Action mailed Mar. 18, 2024", w/ English translation, 18 pgs.
"Chinese Application Serial No. 202180062923.8, Office Action mailed Mar. 20, 2024", w/ English translation, 21 pgs.
"U.S. Appl. No. 17/480,513, Non Final Office Action mailed Jul. 16, 2024", 14 pgs.
"Chinese Application Serial No. 202180062937.X, Office Action mailed Jul. 16, 2024", w/ English Translation, 17 pgs.
"Chinese Application Serial No. 202180054782.5, Office Action mailed Aug. 2, 2024", w/ English Translation, 14 pgs.
U.S. Appl. No. 17/480,513, Response filed Oct. 14, 2024 to Non Final Office Action mailed Jul. 16, 2024, 13 pgs.
"U.S. Appl. No. 17/477,359, Response filed Aug. 9, 2024 to Non Final Office Action mailed May 14, 2024", 11 pgs.
"U.S. Appl. No. 17/477,359, Examiner Interview Summary mailed Aug. 15, 2024", 2 pgs.
"Chinese Application Serial No. 202180062923.8, Response filed Jul. 22, 2024 to Office Action mailed Mar. 20, 2024", 9 pgs.
"U.S. Appl. No. 17/477,359, Final Office Action mailed Sep. 27, 2024", 16 pgs.
"Chinese Application Serial No. 202180054782.5, Response filed Sep. 30, 2024 to Office Action mailed Aug. 2, 2024", w/ English claims, 15 pgs.
"Chinese Application Serial No. 202180062923.8, Office Action mailed Sep. 26, 2024", w/ English Translation, 24 pgs.

* cited by examiner

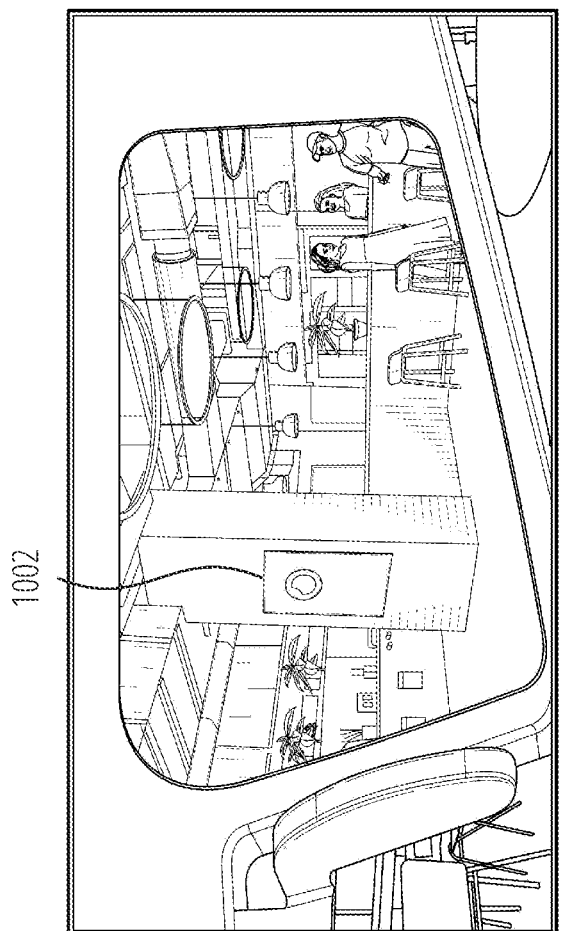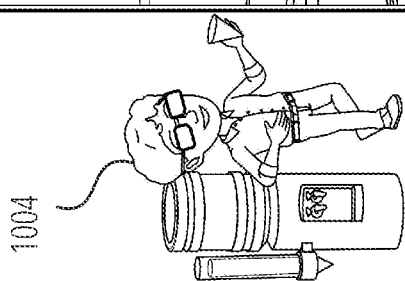
FIG. 10

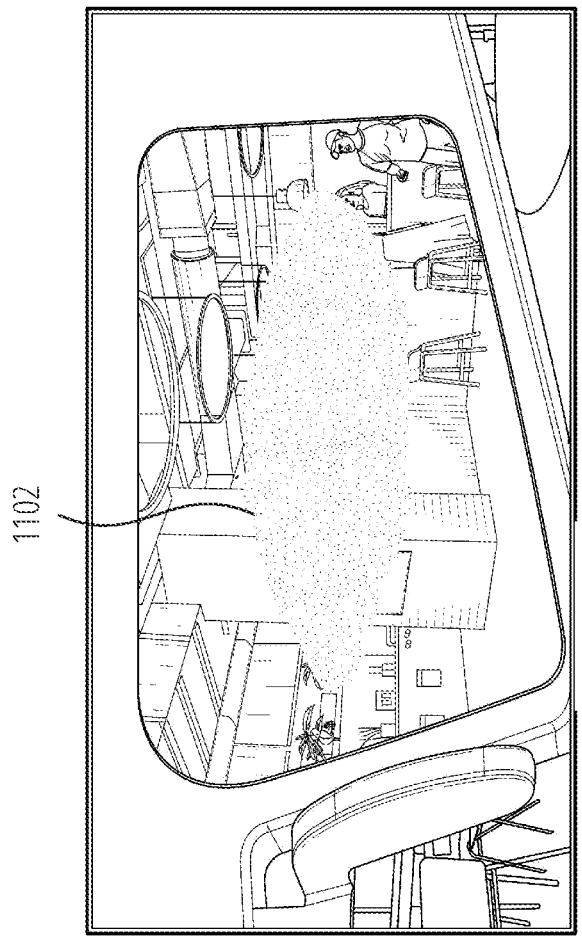
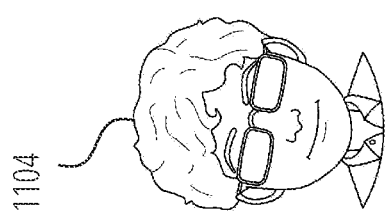
FIG. 11

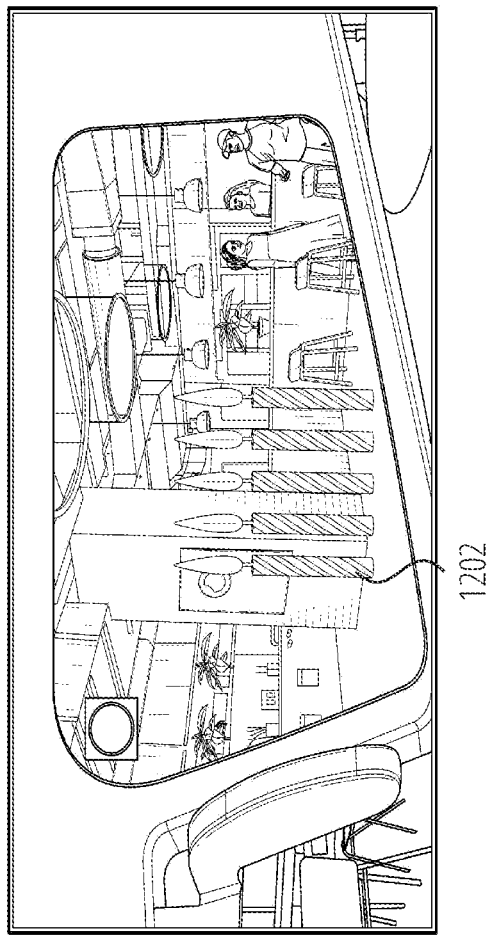
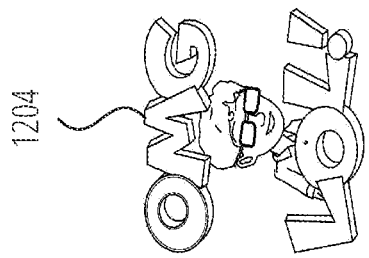
FIG. 12

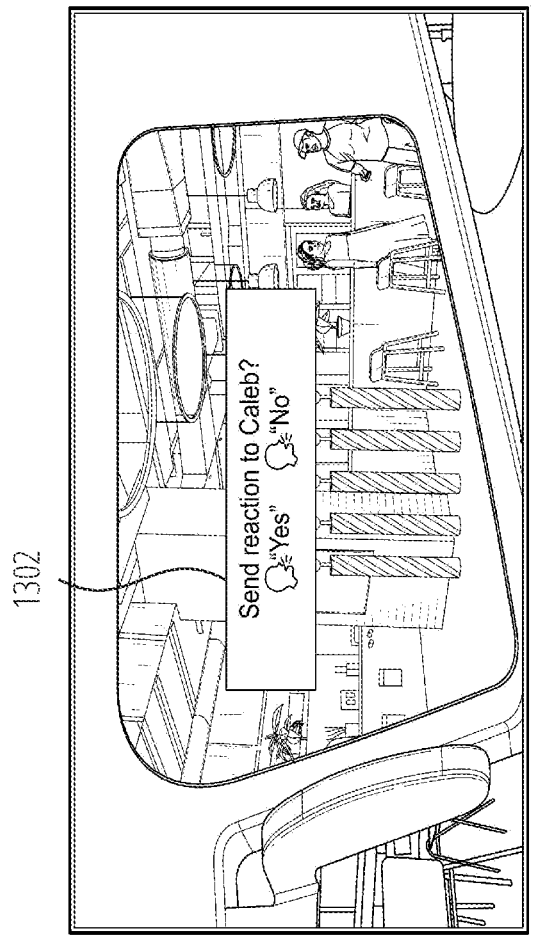
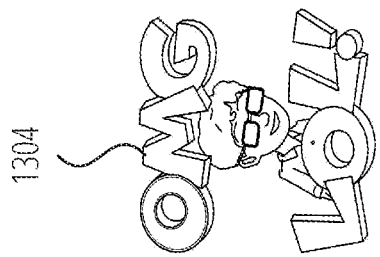
FIG. 13

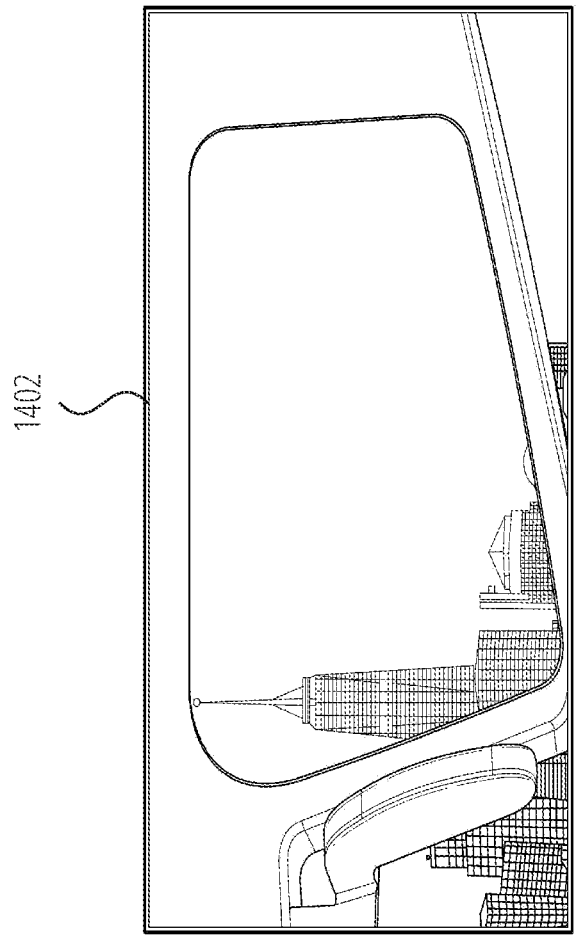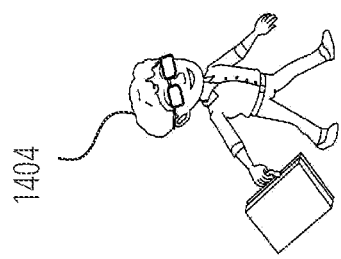
FIG. 14

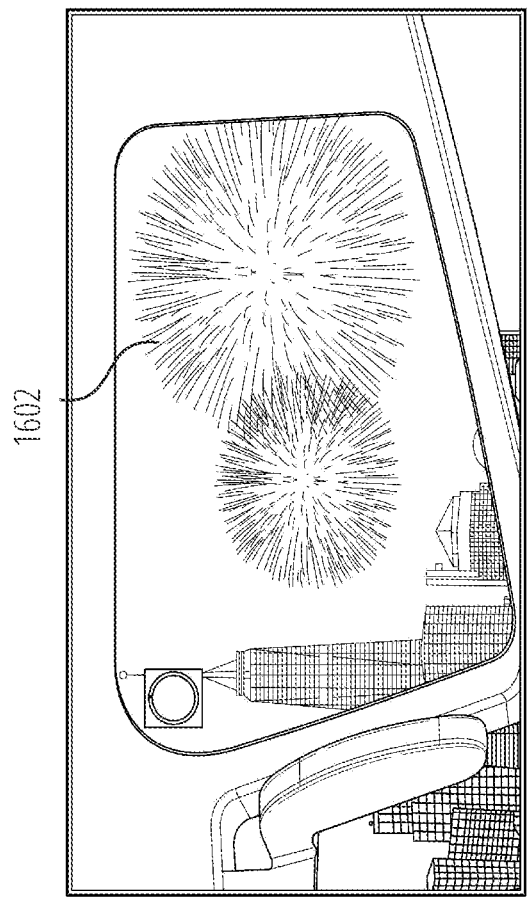
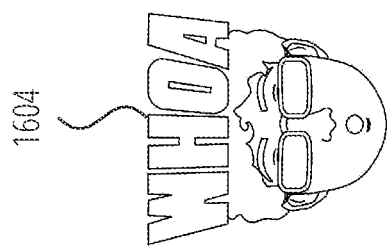
FIG. 16

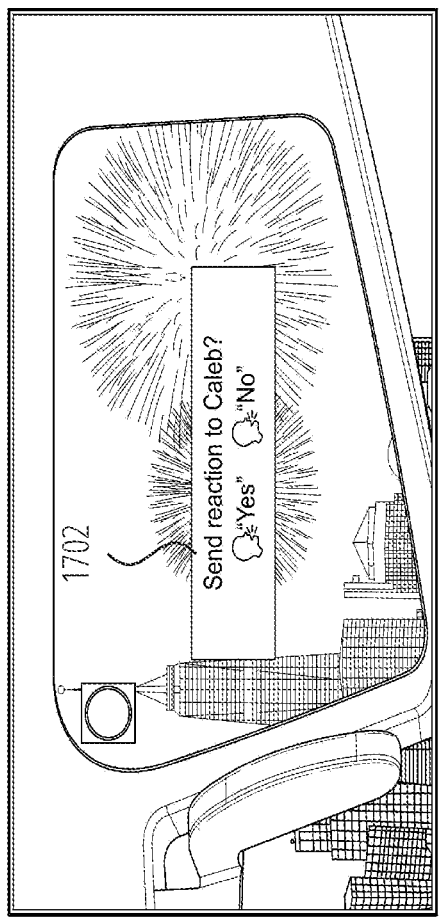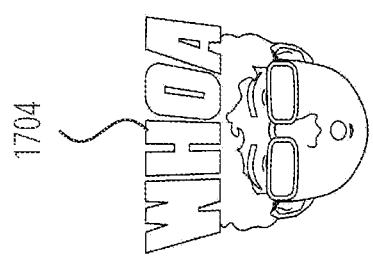
FIG. 17

AUGMENTED REALITY MESSENGER SYSTEM

CLAIM OF PRIORITY

This application claims the benefit of priority to U.S. Provisional Application Ser. No. 62/706,776, filed Sep. 9, 2020, which is incorporated herein by reference in its entirety.

TECHNICAL FIELD

Embodiments of the present disclosure relate generally to asynchronous communication systems. More specifically, but not by way of limitations, systems and methods herein describe an asynchronous augmented reality system.

BACKGROUND

Synchronous communication platforms allow people to communicate efficiently in real-time. Users can convey relevant, real-time information to one another while being online at the same time. On the other hand, asynchronous communication platforms allow users to communicate regardless of whether they are both online at the same time.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 10 illustrate a visual marker trigger-based AR message, according to some example embodiments.

FIG. 11 illustrate a visual marker trigger-based AR message, according to some example embodiments.

FIG. 12 illustrate a visual marker trigger-based AR message, according to some example embodiments.

FIG. 13 illustrate a visual marker trigger-based AR message, according to some example embodiments.

FIG. 14 illustrate a time period trigger and location trigger-based AR message, according to some example embodiments FIG. 15 illustrate a time period trigger and location trigger-based AR message, according to some example embodiments.

FIG. 16 illustrate a time period trigger and location trigger-based AR message, according to some example embodiments FIG. 17 illustrate a time period trigger and location trigger-based AR message, according to some example embodiments.

DETAILED DESCRIPTION

Figure 1:
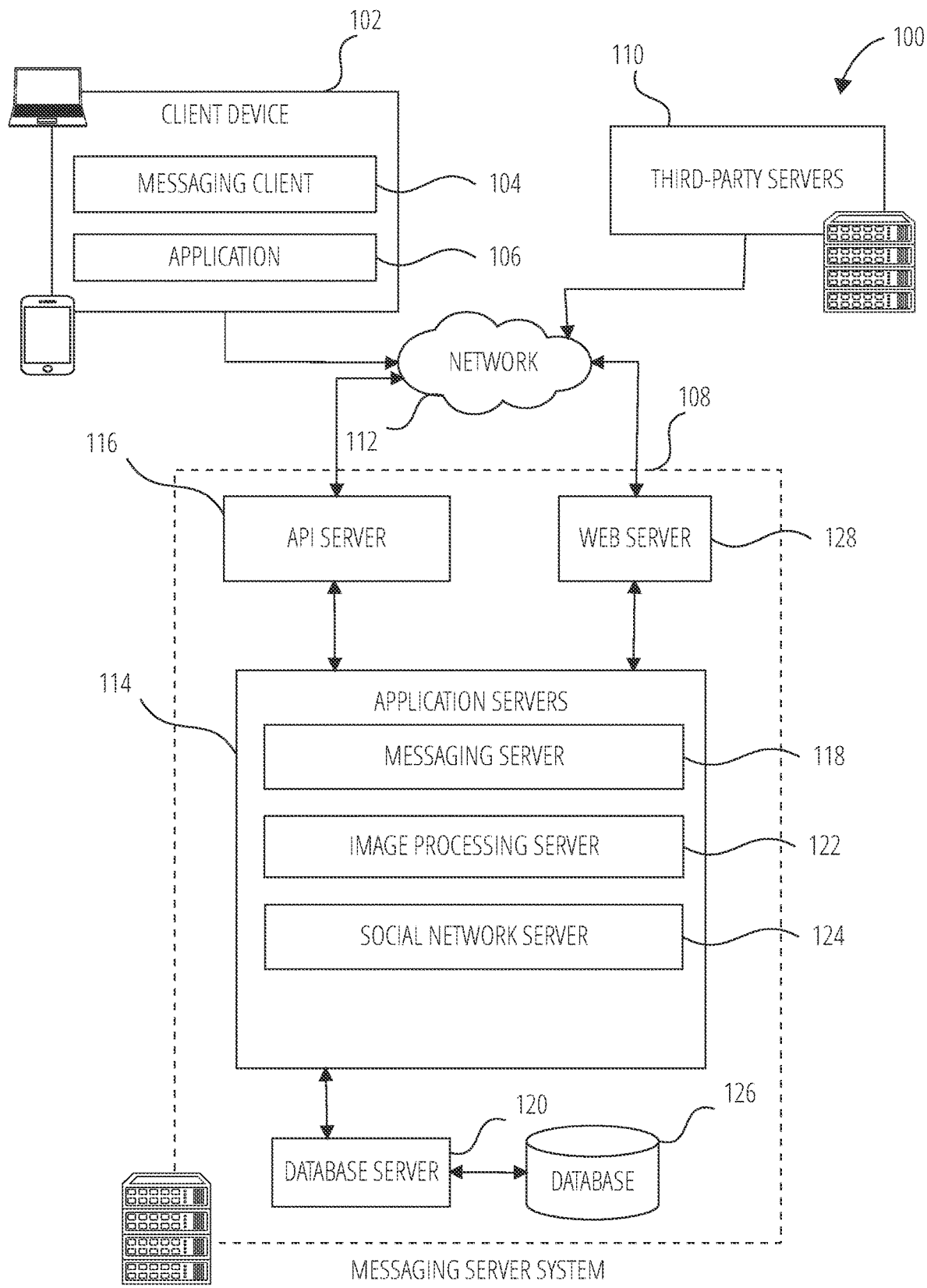
FIG. 1 is a diagrammatic representation of a networked environment in which the present disclosure may be deployed, in accordance with some examples.

An augmented reality messenger system allows users to send augmented reality (AR) messages to friends on a messaging platform. An AR message includes AR content bundled together with an audio message (e.g., a voice recorded message). The AR message can be delivered immediately or pre-scheduled for particular moments defined by time, location, or an object. The AR messenger system allows smartphone users to send AR messages. In some examples, the AR messenger system sends AR messages to friends wearing AR glasses. The AR messenger system overlays the AR messages onto the AR glasses wearer's view and captures the wearer's reaction to the AR message. The AR messenger system further allows the wearer to share their reaction back to the sender. Although the following paragraphs describe sending the AR message to a user wearing AR glasses, it is understood that the AR message may be displayed on any other suitable computing device, such as a smartphone.

The AR messenger system thus allows for synchronous or asynchronous communication. The AR message may be sent instantly, or pre-scheduled. For example, a sender can schedule an AR message using a set of pre-defined conditions that once triggered, will allow the AR message to be overlaid onto the receiver's view (e.g., the AR glasses wearer). The set of pre-defined conditions include but are not limited to, a location trigger, a time period trigger and a visual marker trigger.

The location trigger can be a physical address on a map, for example. In some examples the location trigger can be geographical coordinates (e.g., latitude and longitude), a general city (e.g., San Francisco), or an intersection of two streets. Once the AR glasses wearer is at the physical address or within a predefined threshold of the physical address, the AR message will be triggered. The time period trigger can be a time frame during which the AR message will be triggered. For example, a time frame may be 9:00 AM to 10:30 AM, The time frame can be associated with the time zone of the AR glasses wearer (e.g., the receiver of the AR message). In another example the time period trigger could be a specific time (e.g., 12:00 PM). The visual marker trigger can be an object that appears in the field of view of the AR glasses wearer. For example, the visual marker trigger may be a specific logo at the AR glasses wearer's workplace. Once the specific logo appears in the AR glasses wearer's field of view, the visual marker trigger condition is satisfied and the AR message is overlaid onto the AR glasses wearer's field of view. In some examples the visual marker trigger may be a specific color or texture.

The AR messenger system allows the AR glasses wearer to record a reaction to the AR message once the AR message is overlaid onto the AR glasses wearer's field of view. For example, the AR glasses wearer can record an audio message of the wearer reacting in real-time to the AR message being overlaid onto their field of view. The AR glasses wearer has the option to send the reaction back to the AR message sender. In some examples, the reaction along with the AR message overlaid onto the AR glasses wearer's field of view are sent back to the AR message sender.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data text, audio, video or other multimedia data). The messaging client 104 further can generate and transmit context-based AR messages between multiple client devices 102.

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
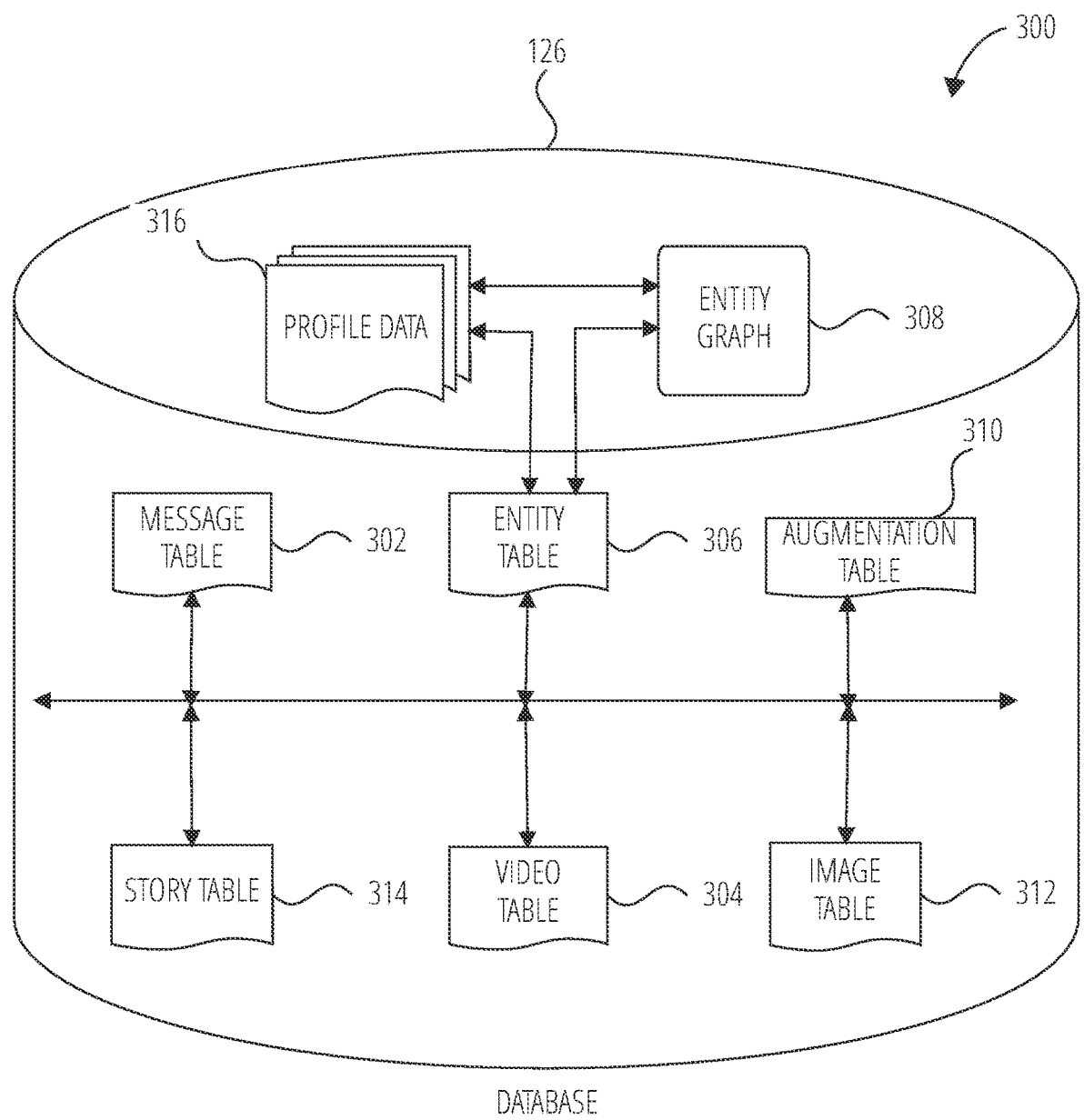
FIG. 3 is a diagrammatic representation of a data structure as maintained in a database, ire accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third, party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104, In addition to using markup-language documents (e.g., a .*ml file), an apples may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104, The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
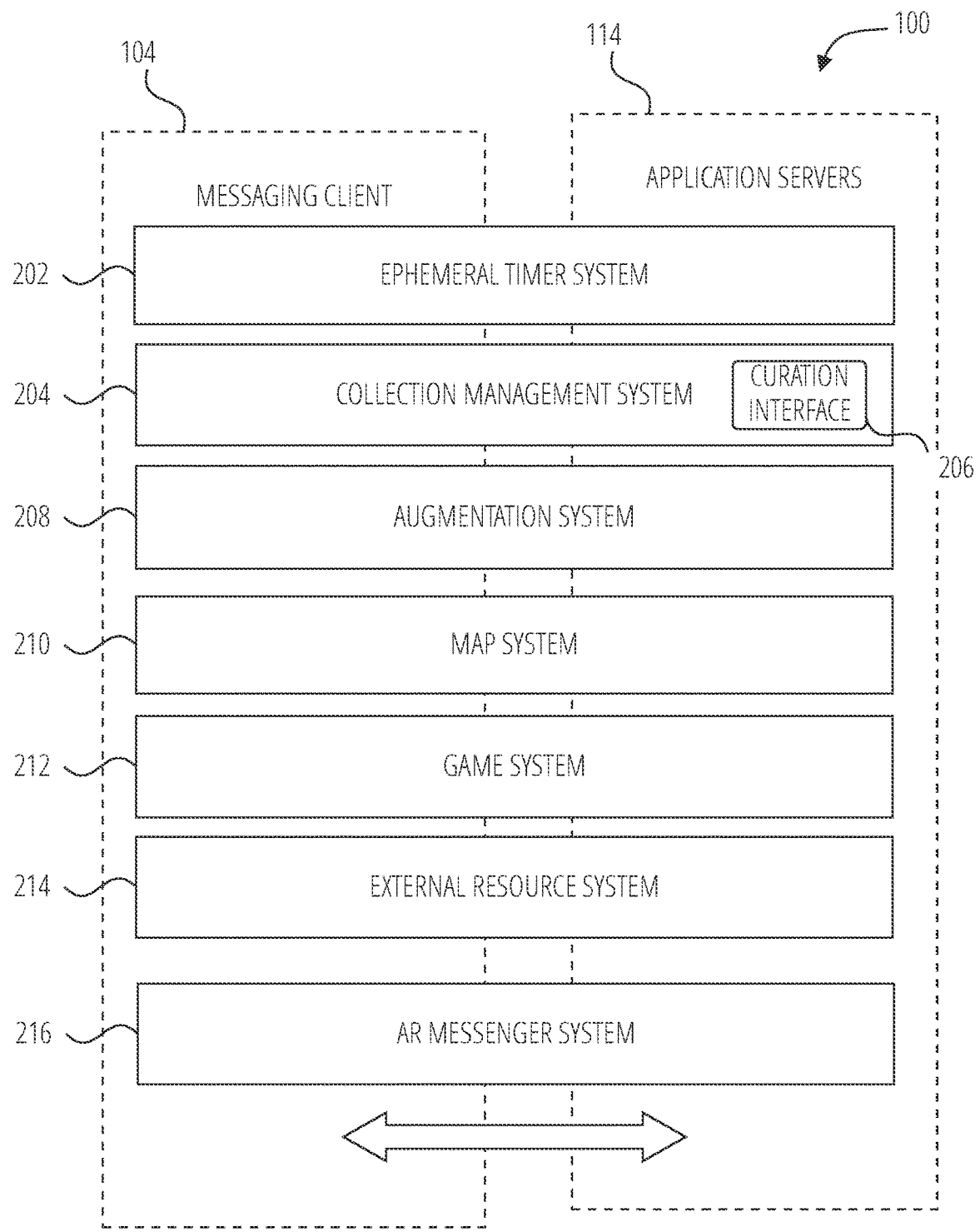
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and an AR Messenger System 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104, The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application, ire certain examples, the messaging server 118 includes a JavaScript library that provides a given external resource access to certain user data of the messaging client 104. HTML5 is used as an example technology for programming games, but applications and resources programmed based on other technologies can be used.

The AR Messenger System 216 sends AR messages from a first computing device to a second computing device. The AR message can be delivered immediately or pre-scheduled for particular moments defined by a location trigger, time period trigger, or a visual marker trigger. The AR Messenger System 216 allows smartphone users to send AR messages. In some examples, the AR Messenger System 216 sends AR messages to friends wearing AR glasses. The AR Messenger System 216 overlays the AR messages onto the AR glasses wearer's view and captures the wearer's reaction to the AR message. The AR Messenger System 216 further allows the wearer to share their reaction back to the sender. In some examples, the AR Messenger System 216 sends messages to another smartphone or any suitable computing device. Some aspects of the AR. Messenger System 216 may operate on the messaging client. Some aspects of the AR Messenger System 216 may operate on the application servers 114.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewhvaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics), As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location.

For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind, example, a user can load video files and save them in a memory of a device, or can generate a video stream using sensors of the device, Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh, A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image: data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

The database 126 can also store AR messages generated by the AR Messenger System 216.

Data Communications Architecture

Figure 4:
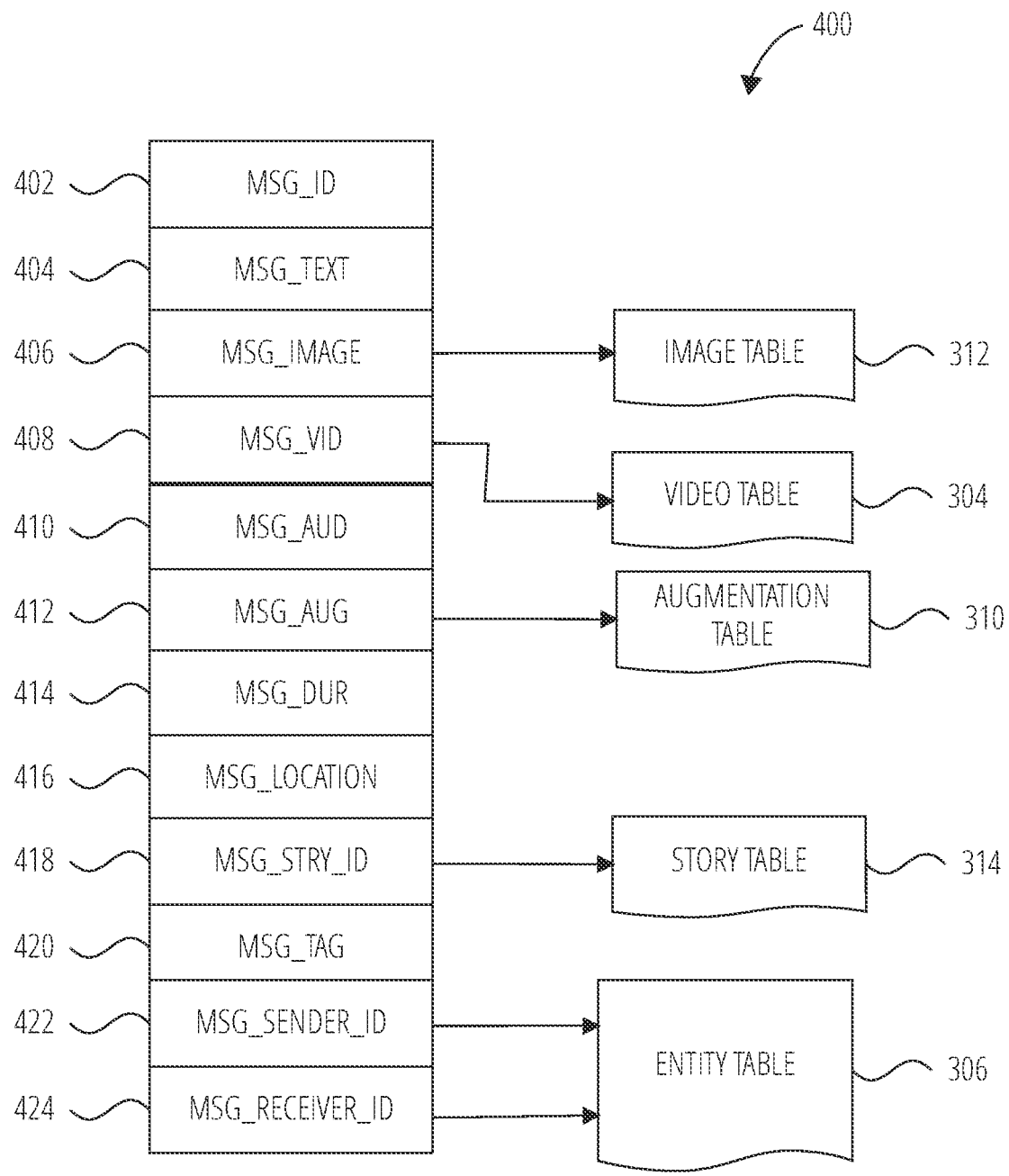
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400, Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via, the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
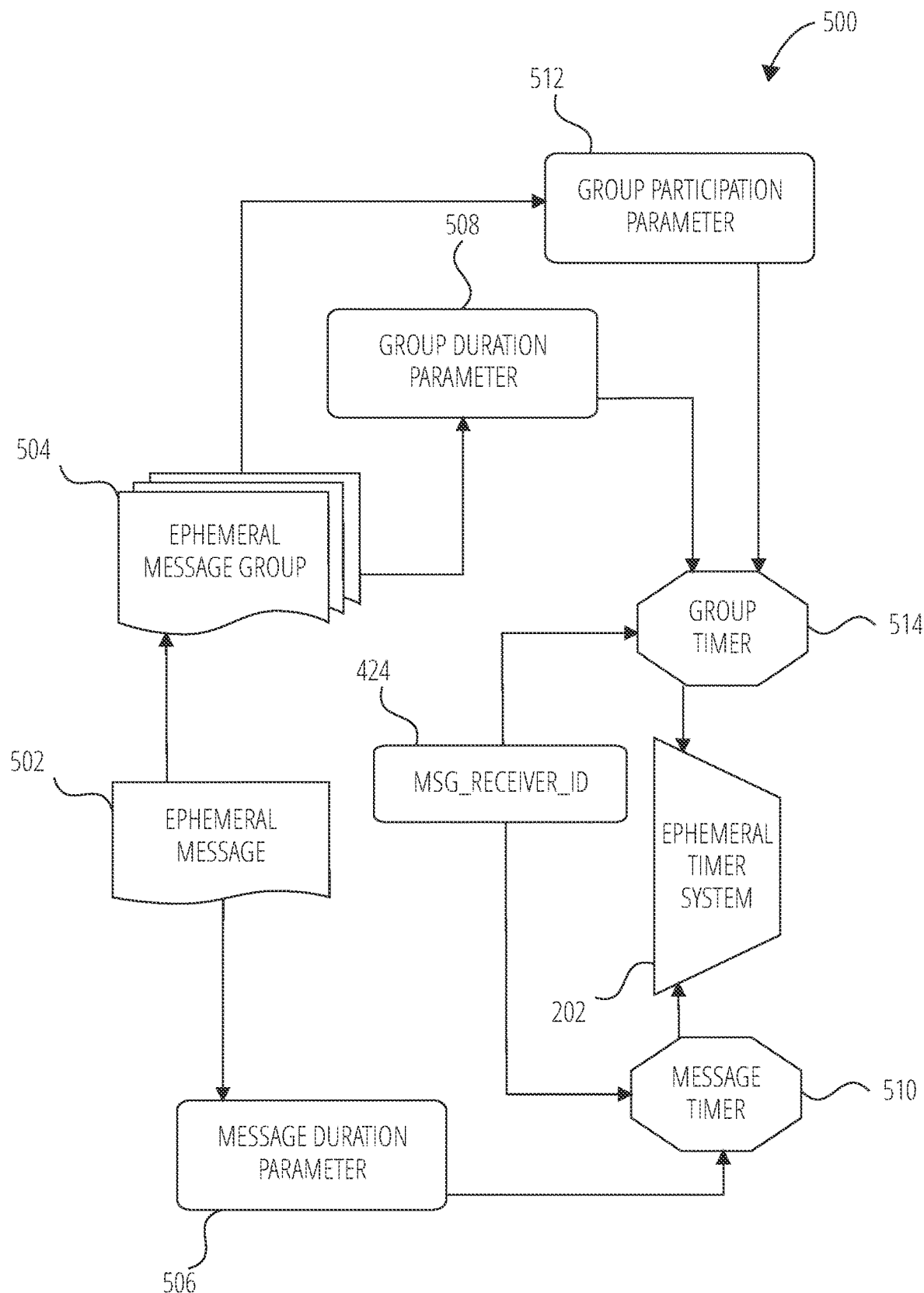
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
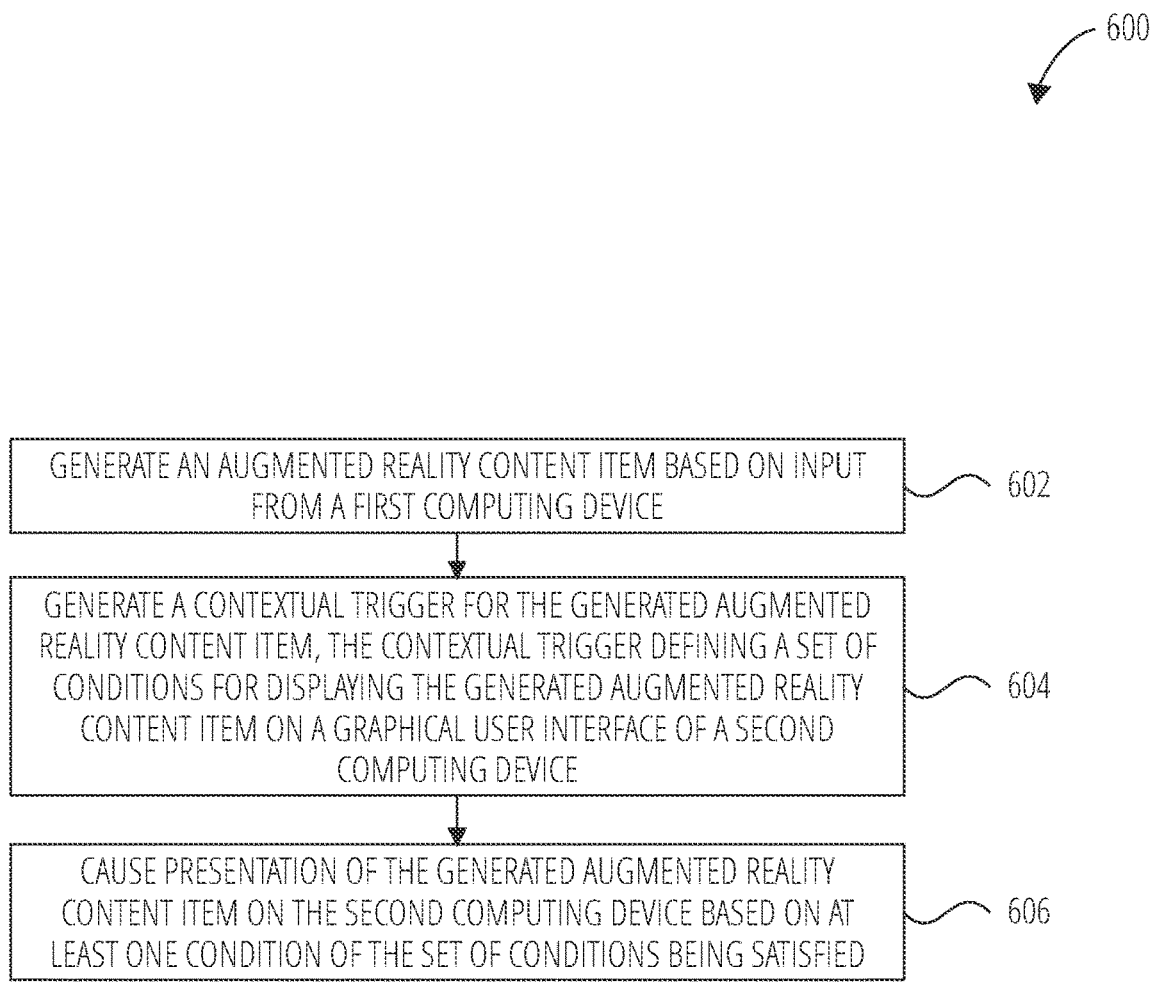
FIG. 6 is a flowchart for generating a context-based AR message, according to some example embodiments.

FIG. 6 is a flowchart of a method 600 for generating a context-based AR message, according to some example embodiments. The operations described below may be performed by the AR. Messenger System 216. Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In operation 602, the AR Messenger System 216 generates an augmented reality content item based on input from a first computing device. The augmented reality content item may be the augmented reality content items discussed above in relation to FIG. 3. The sender of the AR message e.g., the user of the first computing device) can access an augmented reality content item to send as part of the AR message. In another example, the sender can generate a specific augmented reality content item via the graphical user interface of the first computing device. In operation 604, the AR Messenger System 216 generates a contextual trigger for the generated augmented reality content, the contextual trigger defining a set of conditions for displaying the generated augmented reality content item on a graphical user interface of a second computing device. In some examples, the contextual trigger is generated based on user input specified via a graphical user interface of the first computing device. In operation 606, AR Messenger System 216 causes presentation of the generated augmented reality content item on the second computing device based on at least condition of the set of conditions being satisfied. In some examples, the first computing device is a smartphone and the second computing device is a pair of AR glasses.

The location trigger can be a physical address on a map, for example. In some examples the location trigger can be geographical coordinates (e.g., latitude and longitude), a general city (e.g., San Francisco), or an intersection of two streets, Once the AR glasses wearer is at the physical address or within a predefined threshold of the physical address, the AR message will be triggered. The time period trigger can be a time frame during which the AR message will be triggered. For example, a time frame may be 9:00 AM to 10:30 AM. The time frame can be associated with the time zone of the AR glasses wearer (e.g., the receiver of the AR message). In another example the time period trigger could be a specific time (e.g., 12:00 PM). The visual marker trigger can be an object that appears in the field of view of the AR glasses wearer. For example, the visual marker trigger may be a specific logo at the AR glasses wearer's workplace. Once the specific logo appears in the AR glasses wearer's field of view, the visual marker trigger condition is satisfied and the AR message is overlaid onto the AR glasses wearer's field of view. In some examples the visual marker trigger may be a specific color or texture.

In some examples, the AR Messenger System 216 captures, from the second computing device, a video. For example, the AR Messenger System 216, captures a video of the receiver's field of view. The AR Messenger System 216 determines that at least one condition of the set of conditions has been satisfied. In response to determining that at least one condition of the set of conditions has been satisfied, the AR Messenger System 216, modifies the video with the augmented reality content item during capture of the video. The AR Messenger System 216 captures the receiver's reaction to the modified video and transmits the receiver's reaction and the modified video to the first computing device.

The sender has the option of setting one or more triggers for the AR message via the graphical user interface of the first computing device. For example, the sender may set a location trigger. In order to determine that the location trigger has been satisfied, the AR Messenger System 216 identifies, using one or more sensors, a current location of the second computing device and determines that the current location of the second computing device matches the location trigger. In some examples, the sender may include a radius around the predefined physical address defined by the location trigger that satisfies the location trigger condition. For example, the sender may define the location trigger to include the physical address of the receiver's home and a one-mile radius surrounding their home. Thus, if the receiver is at their house, or within one mile of their house, the AR Messenger System 216 determines that the location trigger condition is satisfied.

If the sender sets the time period trigger, in order to determine that the time period trigger has been satisfied, the AR Messenger System 216 identifies a current time during capture of the video and determines that the current time falls within the time period trigger.

If the sender sets the visual marker trigger, in order to determine that the visual marker trigger has been satisfied, the AR Messenger System 216 identifies an object in the video during capture and determines that object matches the visual marker trigger.

The receiver has the option of sending their reaction back to the sender. For example, after the AR Messenger System 216 has captured the user reaction, the AR Messenger System 216 causes presentation of a pop-up window on the graphical user interface of the second computing device. The graphical user interface may display visual cues representing an option for transmitting the user reaction with the modified video to the first computing device. For example, the visual cues may include a thumbs up indicating that the receiver wants to send their reaction, or a thumbs down, indicating that the receiver does not want to send their reaction. If the AR Messenger System 216 identifies a thumbs up cue by the receiver, it will transmit the receiver's reaction and the modified video to the first computing device. If the AR Messenger System 216 identifies a thumbs down cue, it will not transmit the receiver's reaction and the modified video to the first computing device. In some examples the visual cues may include a first graphic indicating that the receiver needs to say "Yes" to send their reaction, and a second graphic indicating that the receiver needs to say "N©" to refrain from sending their reaction. In some examples, the receiver's reaction is recorded as an audio file. In some examples, the receiver may send only their reaction back to the sender without sending the modified video.

Figure 7:
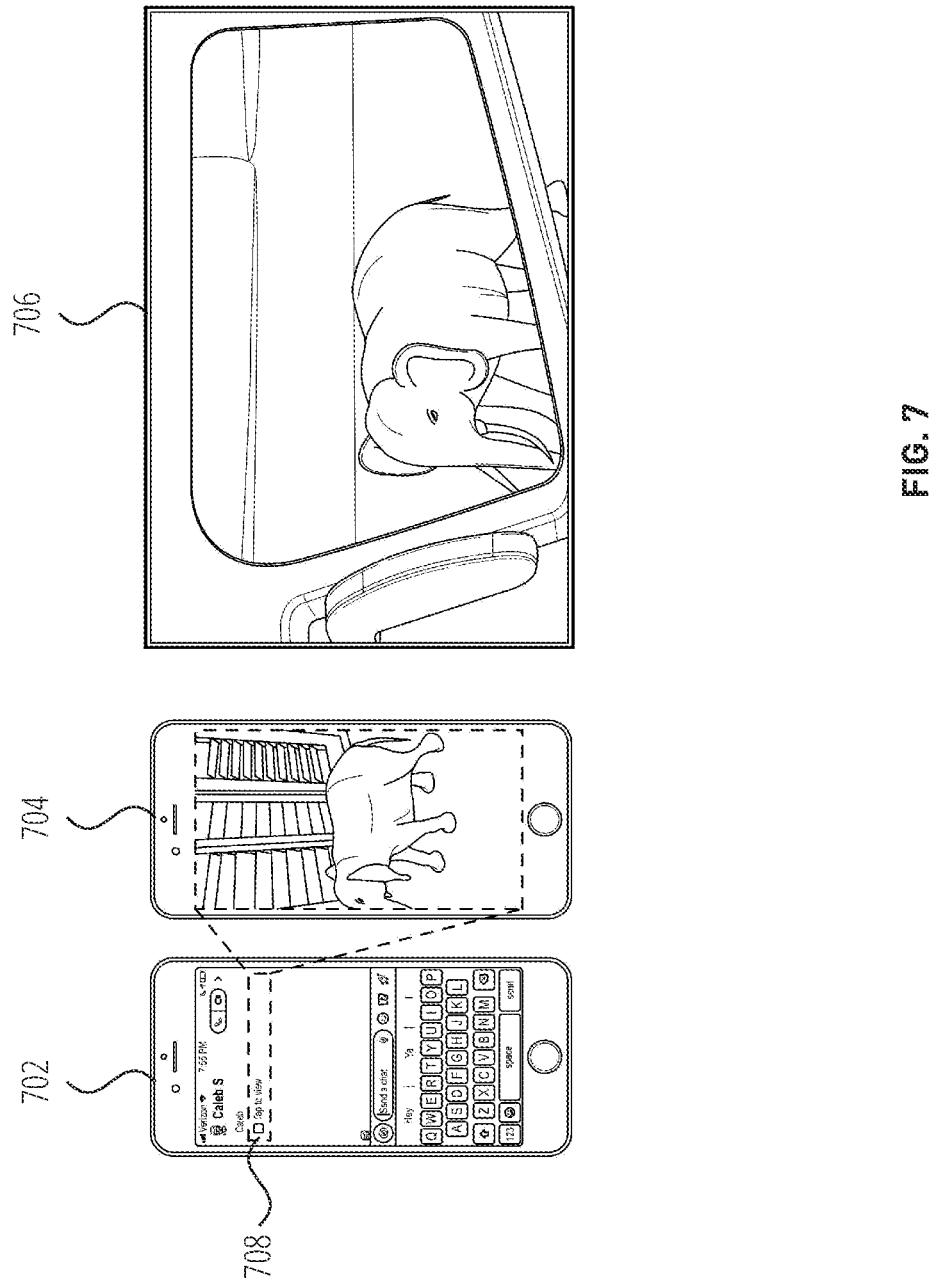
FIG. 7 is an illustration of an augmented reality message, according to some example embodiments.

FIG. 7 is an illustration of an AR message, according to some example embodiments. While the AR Messenger System 216 allows users to interact natively with AR message content instead of viewing AR message content as part of a photo or a video. Item 702 is a view of a message thread between two users. In response to opening a message 708, the user is shown the contents of the message 704. The contents of the message 704 include AR message content. The user may be an AR glasses wearer and view the AR message content on the AR glasses as shown in item 706.

Figure 8:
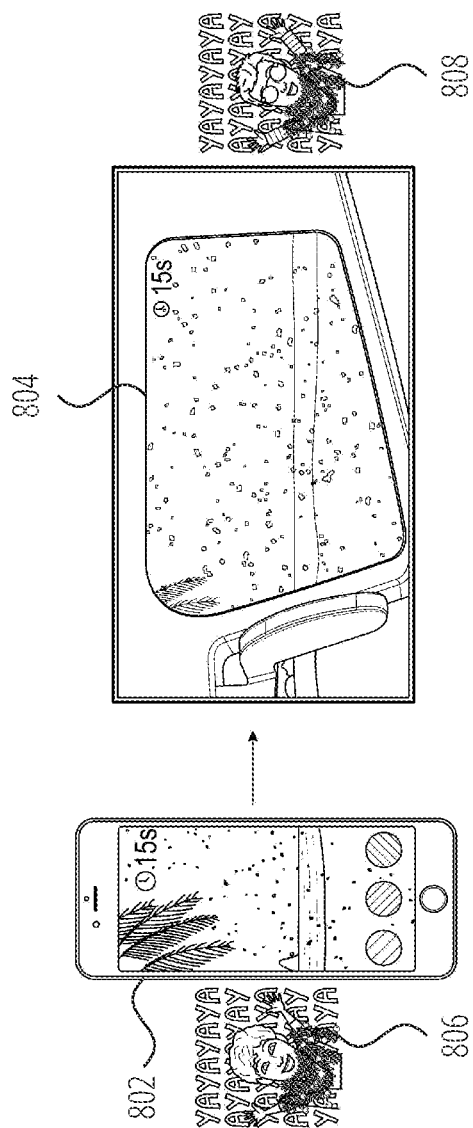
FIG. 8 is an illustration of an augmented reality message, according to some example embodiments.

FIG. 8 is an illustration of an AR message, according to some example embodiments. In some examples, the AR Messenger System 216 allows for a sender 806 of an AR message to see what the AR glasses wearer is seeing (as shown in item 802) on a computing device of the sender 806. For example, a sender can see that the wearer is on the beach during the winter and is missing out on a snowy day. The sender can generate an AR message with falling snow and send it to the wearer. The wearer's 808 reality is augmented by the falling snow as shown in item 804.

Figure 9:
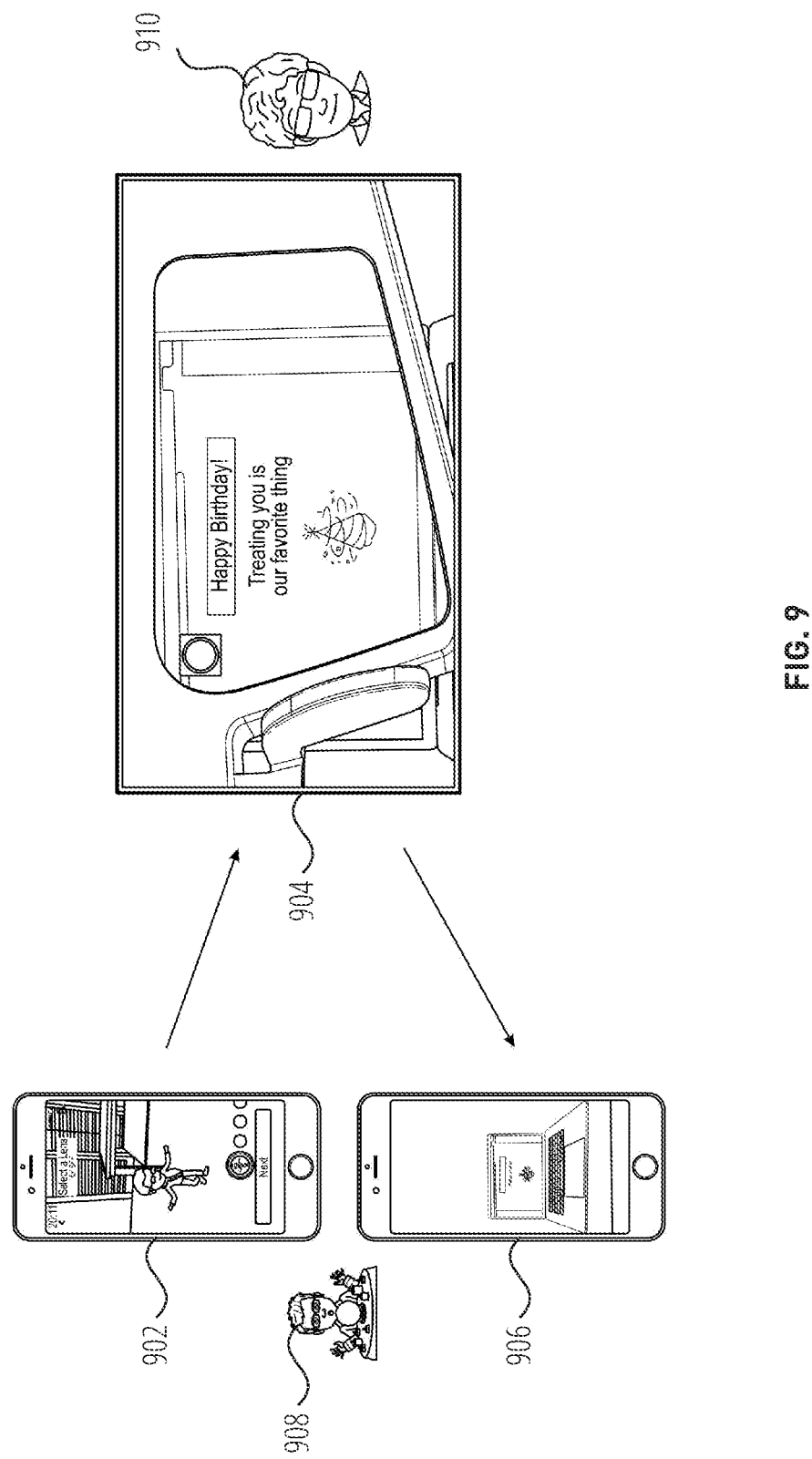
FIG. 9 illustrate is an illustration of an AR messenger system, according to some example embodiments.

FIG. 9 is an illustration of an AR messenger system, according to some example embodiments. At item 902, the AR message sender 908, sends a condition-based AR message. At item 904, the AR message is triggered. For example, at least one condition of the predefined conditions (e.g., time period trigger, location trigger, visual marker trigger) is matched. At item 906, the AR glasses wearer 910 reacts to the AR message and sends their reaction back to the sender.

FIGS. 10-17 illustrate operation of the AR messenger system, according to some example embodiments. The sender, Caleb, is using the AR Messenger System 216 to enhance Steve's, the AR glasses wearer, birthday experience. Since the sender and receiver are close friends, the sender is able to use the AR Messenger System 216 to provide context-based AR messages that further enhance the receiver's birthday experience.

FIGS. 10-13 illustrate a visual marker trigger-based AR message, according to some example embodiments. In FIG. 10 the receiver 1004 enters the micro-kitchen in his office and sees the poster 1002. The sender knows that the receiver starts his day off by getting a cup of coffee in the office micro-kitchen and designates the poster 1002 as the visual marker trigger. In FIG. 11, once the AR Messenger System 216 identifies the poster 1002 as the visual marker trigger 1102, the receiver's 1104 glasses flash. In FIG. 12, in response to the visual marker trigger, the AR Messenger System 216 overlays AR birthday candles 1202 onto the receiver's 1204 AR glasses. The receiver audibly reacts 1304 to the AR message and in FIG. 13, the AR Messenger System 216, displays a pop window 1302 with voice cues giving the receiver the option to send his reaction back to the sender. If the receiver says 'Yes,' the AR Messenger System 216, will send his reaction back to the sender, and if the receiver says 'NO' the AR Messenger System 216, will not send the reaction back to the sender.

Figure 15:
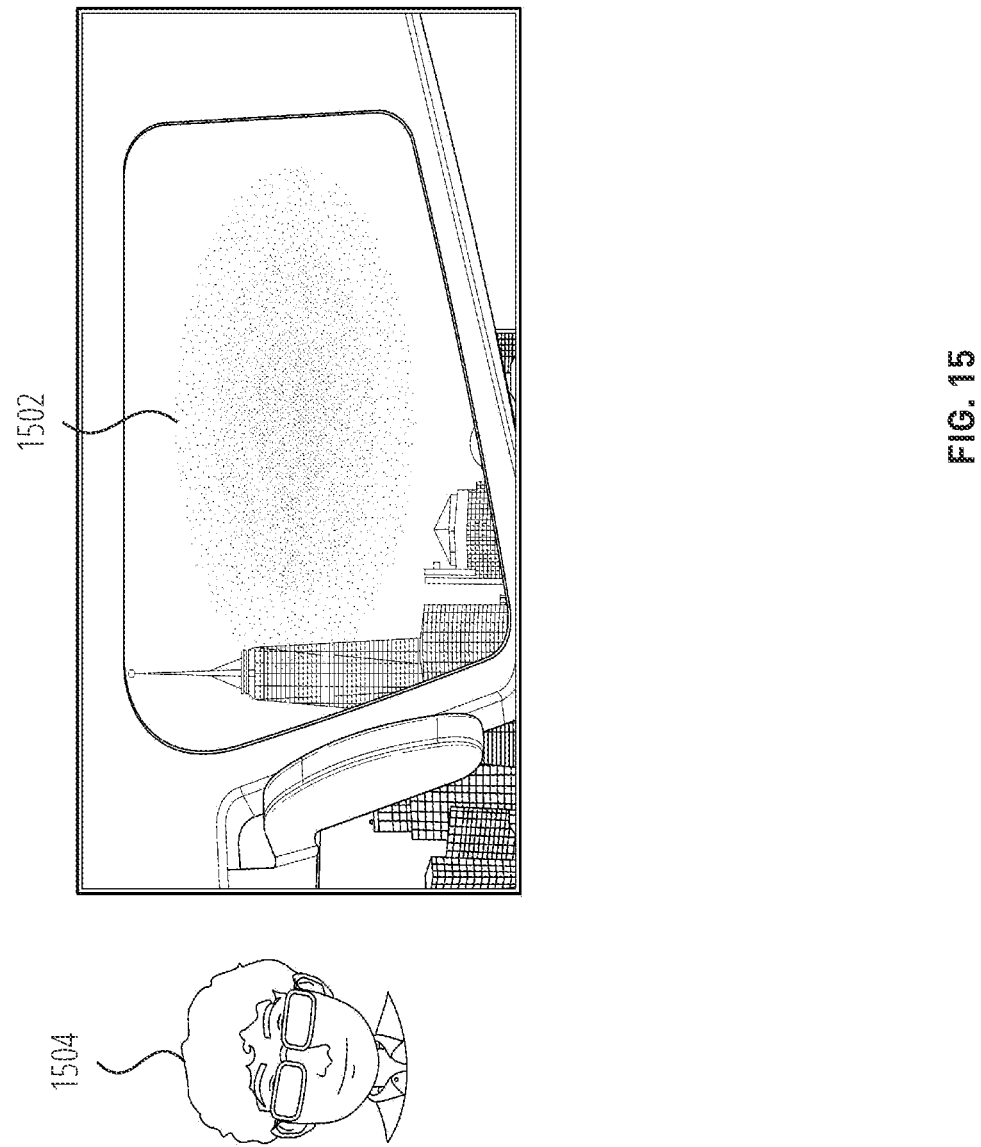

FIGS. 14-17 illustrate a time period trigger and location trigger-based AR message, according to some example embodiments. In FIG. 14 the receiver 1404 is leaving his office and walking back home. During his walk back home the receiver 1404 views a city skyline as depicted in item 1402. The sender knows that the receiver ends his workday between 6:00 PM EST to 8:00 PM EST every night. The sender also knows the physical location of the receiver's home and sets a location trigger to include the physical address of the receiver's home and a 0.5-mile radius around the receiver's home. In FIG. 15, the AR Messenger System 216 identifies that the timer period trigger and the location trigger have both been satisfied and the receiver's 1504 glasses flash 1502. In FIG. 16, the AR Messenger System 216 overlays AR fireworks 1602 in the receiver's 1604 field of view. The receiver audibly reacts 1704 and in FIG. 17, the AR Messenger System 216, displays a pop window 1702 with voice cues giving the receiver the option to send his reaction back to the sender. If the receiver says 'Yes,' the AR Messenger System 216, will send his reaction back to the sender, and if the receiver says 'NO' the AR Messenger System 216, will not send the reaction back to the sender.

Machine Architecture

Figure 18:
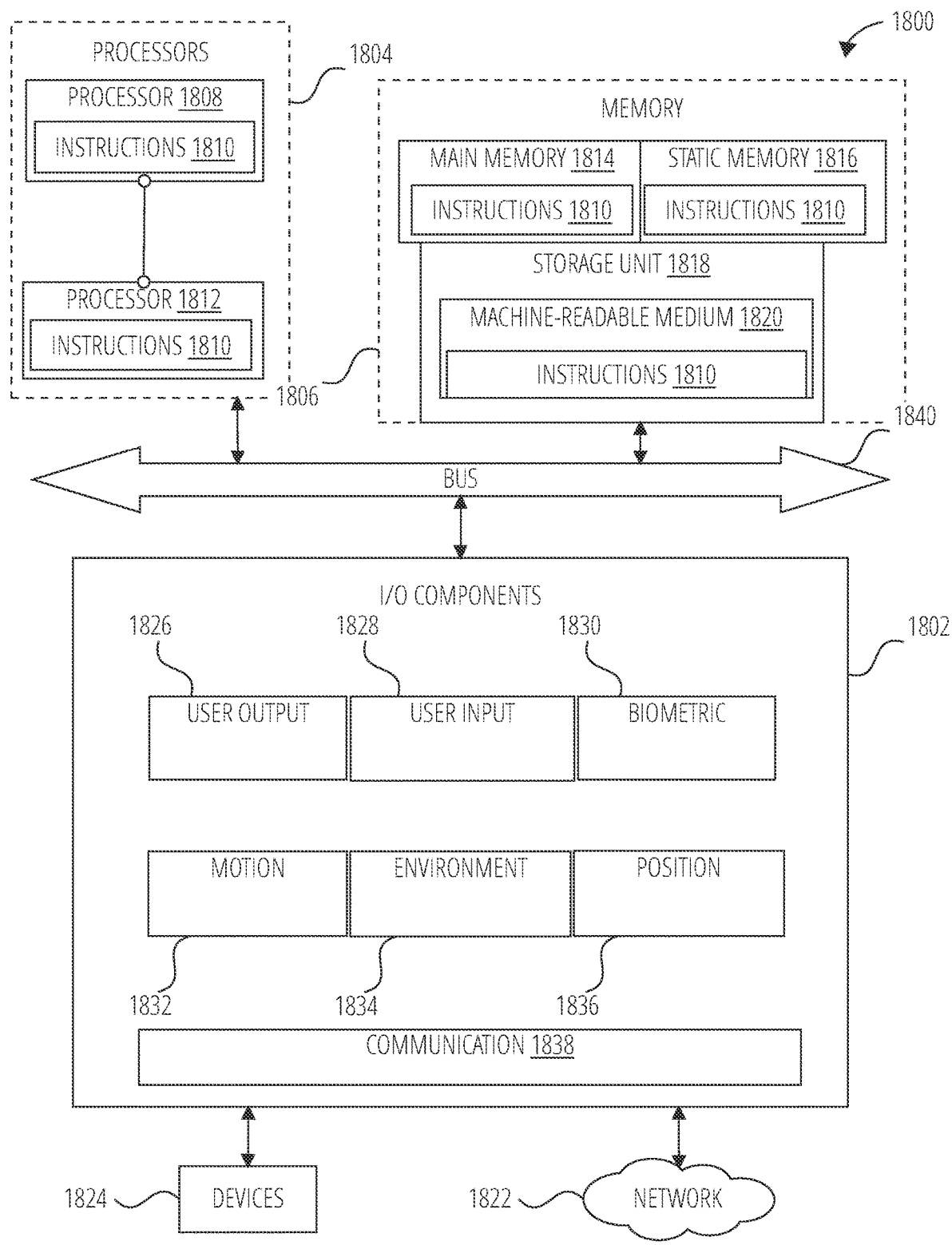
FIG. 18 is a diagrammatic representation of a machine in the form of a computer system within which a set of instructions may be executed for causing the machine to perform any one or more of the methodologies discussed herein, in accordance with some examples.

FIG. 18 is a diagrammatic representation of the machine 180 within which instructions 1810 (e.g., software, a program, an application, an applet, an app, or other executable code) for causing the machine 1800 to perform any one or more of the methodologies discussed herein may be executed. For example, the instructions 1810 may cause the machine 1800 to execute any one or more of the methods described herein. The instructions 1810 transform the general, non-programmed machine 1800 into a particular machine 1800 programmed to carry out the described and illustrated functions in the manner described. The machine 1800 may operate as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1810, sequentially or otherwise, that specify actions to be taken by the machine 1800. Further, while only a single machine 1800 is illustrated, the term "machine" shall also be taken to include a collection of machines that individually or jointly execute the instructions 1810 to perform any one or more of the methodologies discussed herein. The machine 1800, for example, may comprise the client device 102 or any one of a number of server devices forming part of the messaging server system 108. In some examples, the machine 1800 may also comprise both client and server systems, with certain operations of a particular method or algorithm being performed on the server-side and with certain operations of the particular method or algorithm being performed on the client-side.

The machine 1800 may include processors 1804, memory 1806, and input/output I/O components 1802, which may be configured to communicate with each other via a bus 1840. In an example, the processors 1804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1808 and a processor 1812 that execute the instructions 1810. The term "processor" is intended to include multi-core processors that may comprise two or more independent processors (sometimes referred to as "cores") that may execute instructions contemporaneously. Although FIG. 18 shows multiple processors 1804, the machine 1800 may include a single processor with a single-core, a single processor with multiple cores (e.g., a multi-core processor), multiple processors with a single core, multiple processors with multiples cores, or any combination thereof.

The memory 1806 includes a main memory 1814, a static memory 1816, and a storage unit 1818, both accessible to the processors 1804 via the bus 1840. The main memory 1806, the static memory 1816, and storage unit 1818 store the instructions 1810 embodying any one or more of the methodologies or functions described herein. The instructions 1810 may also reside, completely or partially, within the main memory 1814, within the static memory 1816, within machine-readable medium 1820 within the storage unit 1818, within at least one of the processors 1804 (e.g., within the Processor's cache memory), or any suitable combination thereof, during execution thereof by the machine 1800.

The I/O components 1802 may include a wide variety of components to receive input, provide output, produce output, transmit information, exchange information, capture measurements, and so on. The specific I/O components 1802 that are included in a particular machine will depend on the type of machine. For example, portable machines such as mobile phones may include a touch input device or other such input mechanisms, while a headless server machine will likely not include such a touch input device. It will be appreciated that the I/O components 1802 may include many other components that are not shown in FIG. 18. In various examples, the I/O components 1802 may include user output components 1826 and user input components 1828. The user output components 1826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1802 may include biometric components 1830, motion components 1832, environmental components 1834, or position components 1836, among a wide array of other components. For example, the biometric components 1830 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1832 include acceleration sensor components (e.g., accelerometer), gravitation sensor components, rotation sensor components (e.g., gyroscope).

The environmental components 1834 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1836 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1802 further include communication components 1838 operable to couple the machine 1800 to a network 1822 or devices 1824 via respective coupling or connections. For example, the communication components 1838 may include a network interface Component or another suitable device to interface with the network 1822. In further examples, the communication components 1838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1824 may be another machine or any of a wide variety of peripheral devices (e.g., a peripheral device coupled via a USB).

Moreover, the communication components 1838 may detect identifiers or include components operable to detect identifiers. For example, the communication components 1838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1838, such as location via Internet Protocol (IP) geolocation, location via Wi-Fi®, signal triangulation, location via detecting an NFC beacon signal that may indicate a particular location, and so forth.

The various memories (e.g., main memory 1814, static memory 1816, and memory of the processors 1804) and storage unit 1818 may store one or more sets of instructions and data structures (e.g., software) embodying or used by any one or more of the methodologies or functions described herein. These instructions (e.g., the instructions 1810), when executed by processors 1804, cause various operations to implement the disclosed examples.

The instructions 1810 may be transmitted or received over the network 1822, using a transmission medium, via a network interface device (e.g., a network interface component included in the communication components 1838) and using any one of several well-known transfer protocols (e.g., hypertext transfer protocol (HTTP)). Similarly, the instructions 1810 may be transmitted or received using a transmission medium via a coupling (e.g., a peer-to-peer coupling) to the devices 1824.

Software Architecture

Figure 19:
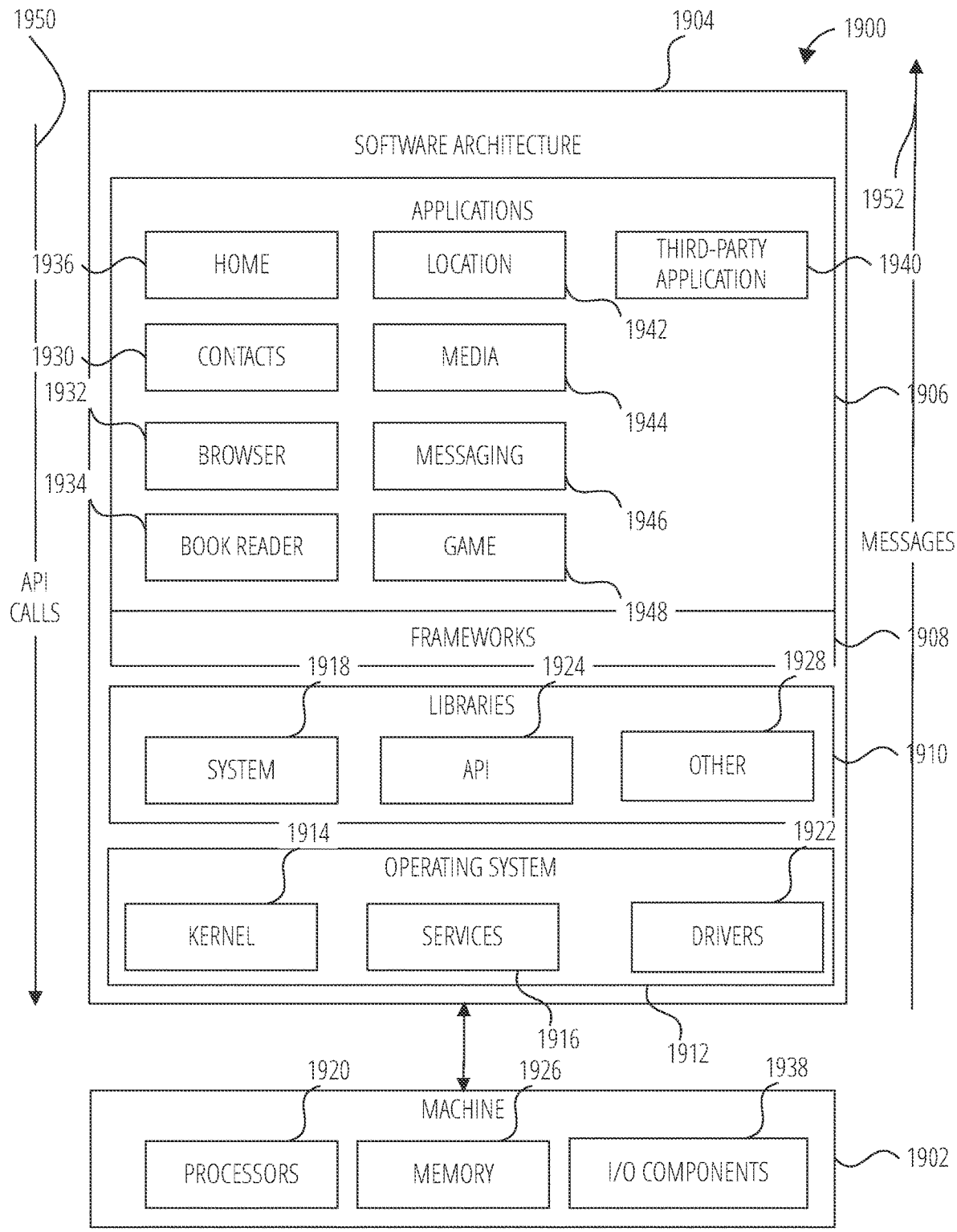
FIG. 19 is a block diagram showing a software architecture within which examples may be implemented.

FIG. 19 is a block diagram 1900 illustrating a software architecture 1904, which can be installed on any one or more of the devices described herein. The software architecture 1904 is supported by hardware such as a machine 1902 that includes processors 1920, memory 1926, and I/O components 1938. In this example, the software architecture 1904 can be conceptualized as a stack of layers, where each layer provides a particular functionality. The software architecture 1904 includes layers such as an operating system 1912, libraries 1910, frameworks 1908, and applications 1906. Operationally, the applications 1906 invoke API calls 1950 through the software stack and receive messages 1952 in response to the API calls 1950.

The operating system 1912 manages hardware resources and provides common services. The operating system 1912 includes, for example, a kernel 1914, services 1916, and drivers 1922. The kernel 1914 acts as an abstraction layer between the hardware and the other software layers. For example, the kernel 1914 provides memory management, processor management (e.g., scheduling), component management, networking, and security settings, among other functionality. The services 1916 can provide other common services for the other software layers. The drivers 1922 are responsible for controlling or interfacing with the underlying hardware. For instance, the drivers 1922 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1910 provide a common low-level infrastructure used by the applications 1906. The libraries 1910 can include system libraries 1918 (e.g., C standard library) that provide functions such as memory allocation functions, string manipulation functions, mathematic functions, and the like. In addition, the libraries 1910 can include API libraries 1924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1910 can also include a wide variety of other libraries 1928 to provide many other APIs to the applications 1906.

The frameworks 1908 provide a common high-level infrastructure that is used by the applications 1906. For example, the frameworks 1908 provide various graphical user interface (GUI) functions, high-level resource management, and high-level location services. The frameworks 1908 can provide a broad spectrum of other APIs that can be used by the applications 1906, some of which may be specific to a particular operating system or platform.

In an example, the applications 1906 may include a home application 1936, a contacts application 1930, a browser application 1932, a book reader application 1934, a location application 1942, a media application 1944, a messaging application 1946, a game application 1948, and a broad assortment of other applications such as a third-party application 1940. The applications 1906 are programs that execute functions defined in the programs. Various programming languages can be employed to create one or more of the applications 1906, structured in a variety of manners, such as object-oriented programming languages (e.g., Objective-C, Java, or C) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1940 can invoke the API calls 1950 provided by the operating system 1912 to facilitate functionality described herein.

What is claimed is:

1. A method comprising:
   generating an augmented reality content item based on input received from a first computing device;
   generating a contextual trigger for the augmented reality content item, the contextual trigger defining a set of conditions for presenting the augmented reality content item on a second computing device;
   accessing a video captured by the second computing device; and
   based on a determination that at least one condition of the set of conditions has been satisfied:
      causing presentation of the augmented reality content item on the second computing device;
      recording an audio file capturing a user reaction as the augmented reality content item is being overlaid onto a field of view of a user at the second computing device;
      modifying the video captured at the second computing device using the augmented reality content item; and
      transmitting the recorded audio file of the user reaction to the first computing device.

2. The method of claim 1, wherein the set of conditions comprise one or more of a time period trigger, a location trigger, or a visual marker trigger.

3. The method of claim 2, wherein the location trigger comprises a location address on a map.

4. The method of claim 2, wherein determining that at least one condition of the set of conditions has been satisfied further comprises:
   identifying, using one or more sensors, a current location of the second computing device; and
   determining that the current location of the second computing device matches the location trigger.

5. The method of claim 2, wherein the determination that at least one condition of the set of conditions has been satisfied further comprises:
   identifying a current time during capture of the video; and
   determining that the current time falls within the time period trigger.

6. The method of claim 2, wherein the determination that at least one condition of the set of conditions has been satisfied further comprises:
   identifying an object in the video during capture; and
   determining that the object matches the visual marker trigger.

7. The method of claim 1, further comprising:
   capturing an additional user reaction to the modified video; and
   transmitting the additional user reaction and the modified video to the first computing device.

8. The method of claim 1, further comprising:
   modifying an additional video captured at the second device using the augmented reality content item;
   causing presentation, on the second computing device, of one or more transmission rejection options; and
   in response to receiving additional audio data associated with a transmission rejection option of the one or more transmission rejection options, forgoing transmitting the modified additional video to the first computing device.

9. The method of claim 1, further comprising:
   causing presentation, on the second computing device, of one or more transmission confirmation options;
   in response to receiving audio data associated with a first transmission confirmation option of the one or more transmission confirmation options, transmitting the user reaction to the first computing device.

10. A system comprising:
    at least one processor; and
    a memory storing instructions that, when executed by the at least one processor, configure the system to perform operations comprising:
       generating an augmented reality content item based on input received from a first computing device;
       generating a contextual trigger for the augmented reality content item, the contextual trigger defining a set of conditions for displaying the augmented reality content item on a second computing device;
       accessing, a video captured by the second computing device; and
       based on a determination that at least one condition of the set of conditions has been satisfied:
          causing presentation of the augmented reality content item on the second computing device;
          recording an audio file capturing a user reaction as the augmented reality content item is being overlaid onto a field of view of a user at the second computing device;
          modifying the video captured at the second computing device using the augmented reality content item; and transmitting the recorded audio file of the user reaction to the first computing device.

11. The system of claim 10, wherein the set of conditions comprise one or more of a time period trigger, a location trigger, or a visual marker trigger.

12. The system of claim 11, wherein the location trigger comprises a location address on a map.

13. The system of claim 11, wherein determining that at least one condition of the set of conditions has been satisfied further comprises:
 identifying, an object in the video during capture; and
 determining that the object matches the visual marker trigger.

14. The system of claim 10, further comprising;
 capturing an additional user reaction to the modified video; and
 transmitting the additional user reaction and the modified video to the first computing device.

15. The system of claim 10, the operations further comprising:
 causing presentation, on the second computing device, of one or more transmission rejection options; and
 the system being further enabled to forgo transmitting the modified video to the first computing device in response to receiving additional audio data associated with a transmission rejection option of the one or more transmission rejection options.

16. A non-transitory computer-readable storage medium including instructions that, when processed by a computer, configure the computer to perform operations comprising:
 generating, an augmented reality content item based on input received from a first computing device;
 generating a contextual trigger for the augmented reality content item, the contextual trigger defining a set of conditions for displaying the augmented reality content item on a second computing device;
 accessing a video captured by the second computing device; and
 based on a determination that at least one condition of the set of conditions has been satisfied:
  causing presentation of the augmented reality content item on the second computing device;
  recording an audio file capturing a first user reaction as the augmented reality content item is being overlaid onto a field of view of a user at the second computing device;
  modifying the video captured at the second computing device using the augmented reality content item; and
  transmitting the recorded audio file of the user reaction to the first computing device.

17. The non-transitory computer-readable storage medium of claim 16, wherein the set of conditions comprise one or more of a time period trigger, a location trigger, or a visual marker trigger.

18. The non-transitory computer-readable storage medium of claim 17, wherein the location trigger comprises a location address on a map.

* * * * *